United States Patent [19]
Yee et al.

[11] Patent Number: 6,147,980
[45] Date of Patent: Nov. 14, 2000

[54] AVIONICS SATELLITE BASED DATA MESSAGE ROUTING AND DELIVERY SYSTEM

[75] Inventors: David Moon Yee, Scottsdale; Robert Henry Bickley, Paradise Valley; Philip John Zucarelli, Glendale; Theodore Woolley Keller; Jeffrey S. Osman, both of Scottsdale; Randall K. Derr, Phoenix, all of Ariz.

[73] Assignee: Motorola, Inc., Schaumburg, Ill.

[21] Appl. No.: 08/980,218

[22] Filed: Nov. 28, 1997

[51] Int. Cl.[7] .......................... H04B 7/212; H04L 12/66; H04L 12/56
[52] U.S. Cl. ...................... 370/316; 370/323; 455/12.1; 701/213
[58] Field of Search ...................................... 370/316, 351, 370/392, 400, 254; 342/357.04, 357.03; 455/12.1, 13.1, 424; 701/120, 200, 206, 213, 300, 13, 215

[56] References Cited

U.S. PATENT DOCUMENTS

| | | | |
|---|---|---|---|
| 5,627,546 | 5/1997 | Crow | 342/352 |
| 5,677,841 | 10/1997 | Shiomi et al. | 701/120 |
| 5,702,070 | 12/1997 | Waid | 244/183 |
| 5,835,059 | 11/1998 | Nadel et al. | 342/398 |
| 5,995,043 | 11/1999 | Murphy | 342/357.03 |
| 6,044,323 | 3/2000 | Yee et al. | 701/120 |

*Primary Examiner*—Chau Nguyen
*Assistant Examiner*—Toan Nguyen
*Attorney, Agent, or Firm*—Badley J. Botsch

[57] ABSTRACT

A data message routing and delivery system for an air traffic control system includes a communications network with one or more ground processing nodes, one or more satellite processing nodes, and one or more avionics processing nodes each configured to send and receive data packets to and from others network processing nodes in the communications network. One or more transmission prioritizing controllers are provided to determine the locations of each of network processing node, and to control access to communication channels and routing of data messages in order of priority between the network processing nodes. An application executing on one network processing node is send to an application executing on another network processing node under the control of the transmission prioritizing controllers. The transmission prioritizing controllers determine the priority ranking of each data packet and cause each data packet to be routed over a communication channel according to its priority ranking from one network node to another until it reaches its destination.

38 Claims, 5 Drawing Sheets

AVIONICS SATELLITE BASED DATA MESSAGE ROUTING AND DELIVERY SYSTEM

FIELD OF THE INVENTION

The present invention relates generally to the field of data communications, and more particularly to a satellite based data message routing and delivery system for use in an air traffic control system.

BACKGROUND OF THE INVENTION

Data messaging services are essential in present day network communications systems. E-mail, wireless file transfers, and networked applications sharing common files are just a few of the many types and uses of data messaging services available over present day local area networks (LANs), wide area networks (WANs), and the internet. In today's information based society, both people and computer based equipment have come to rely on sending and receiving information almost instantaneously.

A critical point in providing or receiving data messaging services is the ability to connect to the network. In present day network systems, it is not necessary, and in fact is not even typical, for each user to connect directly to the network. Rather, a typical user remotely connects to the network via a modem by dialing a conventional telephone number of an access point. The access point is typically a switch owned by a network service provider through which remote callers are authenticated as authorized users and then connected to the network. Accordingly, one limitation of present day networked systems is the requirement that a user have the ability to connect to the network, either directly or remotely. As witnessed by the phenomenal growth of the internet and world wide web, and by the growth in number of both network service providers and network service provider members, connecting to a communications network is not generally problematic.

One area, however, where actual connection to a communications network is quite problematic and sometimes even impossible, and which accordingly results in the general unavailability of in-flight data messaging services, is aboard an airborne aircraft. The reasons for this are multifold. First, most local communications networks are ground based and use line of sight (LOS) communications links. These types of communication systems work well when each node in the communication network is stationary. However, an en route aircraft travels far distances, typically across several geographical ranges and out of range of any single ground based communication system. Furthermore, even in cellular radiotelephone communications systems, which provide communication links for moving subscriber units, the ground based switching centers, or "cells", must each be in communication and are required to conduct a lengthy subscriber authentication process in order to service a "roaming" subscriber unit that is out of range of its "home" cell but which is within the range of control of a "visited" cell. This results because only the home cell of a subscriber has full access to its authentication information (e.g., the factory set electronic serial number (ESN) and corresponding mobile identification number (MIN), which uniquely identifies the subscriber unit from other subscriber units, the subscriber unit's secret cipher key and method of generating a call cipher key). Accordingly, the overhead involved in sending a message is quite high, impractical, and even impossible when the aircraft flies out of range of any cell in the cellular network. Finally, in order to send a data message from one node in a communication network to another, the location of the destination network node must be known. Since an aircraft usually travels in and out of the range of communication of several ground based communication systems, the location of the aircraft is always changing and hence not necessarily known. Accordingly, it is very difficult to configure an airborne aircraft to operate as a network node within any given communication system.

Accordingly, a need exists for a system and method for providing a data message routing and delivery service between ground based networks and airborne aircraft.

BRIEF DESCRIPTION OF THE DRAWINGS

The invention will be better understood from a reading of the following detailed description taken in conjunction with the drawing in which like reference designators are used to designate like elements, and in which.

DETAILED DESCRIPTION OF THE PRESENT INVENTION

Figure 1:
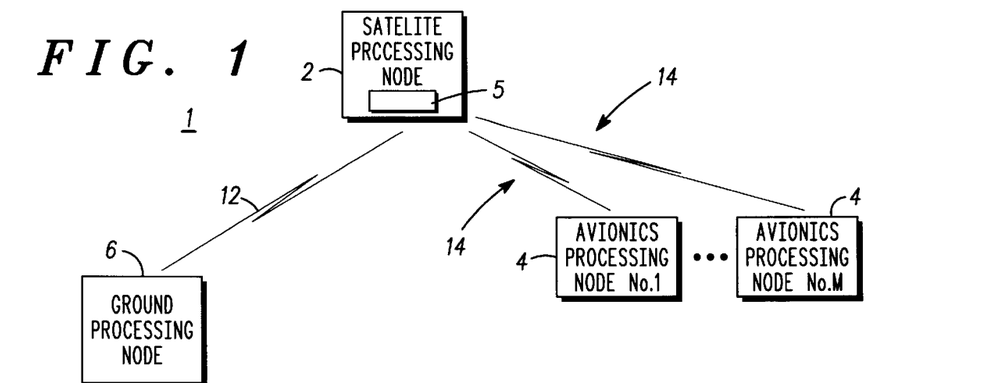
FIG. 1 is a diagram of a communications network in accordance with the invention.

FIG. 1 is a diagram of a communications network, shown generally at 1. In accordance with the present invention, the communication network 1 includes a satellite processing node 2, an avionics processing node 4, and a ground processing node 6. Data messages may be passed between satellite processing node 2 and avionics processing node 4 over a satellite communication link 14. Data messages may be passed between satellite processing node 2 and ground processing node 6 over a satellite ground link 12. The data message routing and delivery system of the present invention is configured to route data messages between any two of the processing nodes 2, 4 or 6 in the communications network 1. Accordingly, data messages sent between ground processing node 6 and avionics processing node 4 are routed through satellite processing node 2. Thus a data message sent from ground processing node 6 is transmitted over satellite ground link 12 to satellite processing node 2, and then over satellite communication link 14 to one of the avionics processing nodes 4. Likewise, a data message sent from an avionics processing node 4 is transmitted over satellite communication link 14 to satellite processing node 2, and then over satellite ground link 12 to ground processing node 6. Data messages may also be passed between different avionics processing nodes 4 by routing the message through satellite processing node 2. For example, a data message sent from the first avionics processing node 4 to the $M^{th}$ avionics processing node 4 is transmitted over a satellite communication link 14 to satellite processing node 2, and then over the same or different satellite communication link 14 to $M^{th}$ avionics processing node 4.

Satellite processing node 2 may comprise a plurality of sub-nodes, as for example a satellite communication network comprising a plurality of satellites in communication via inter-satellite links. Ground processing node 6 may also comprise a plurality of sub-nodes, as for example a local area network comprising a plurality of air traffic controller stations in communication with each other and each sharing a common satellite ground link 12 for communication with satellite processing node 2.

Figure 2:
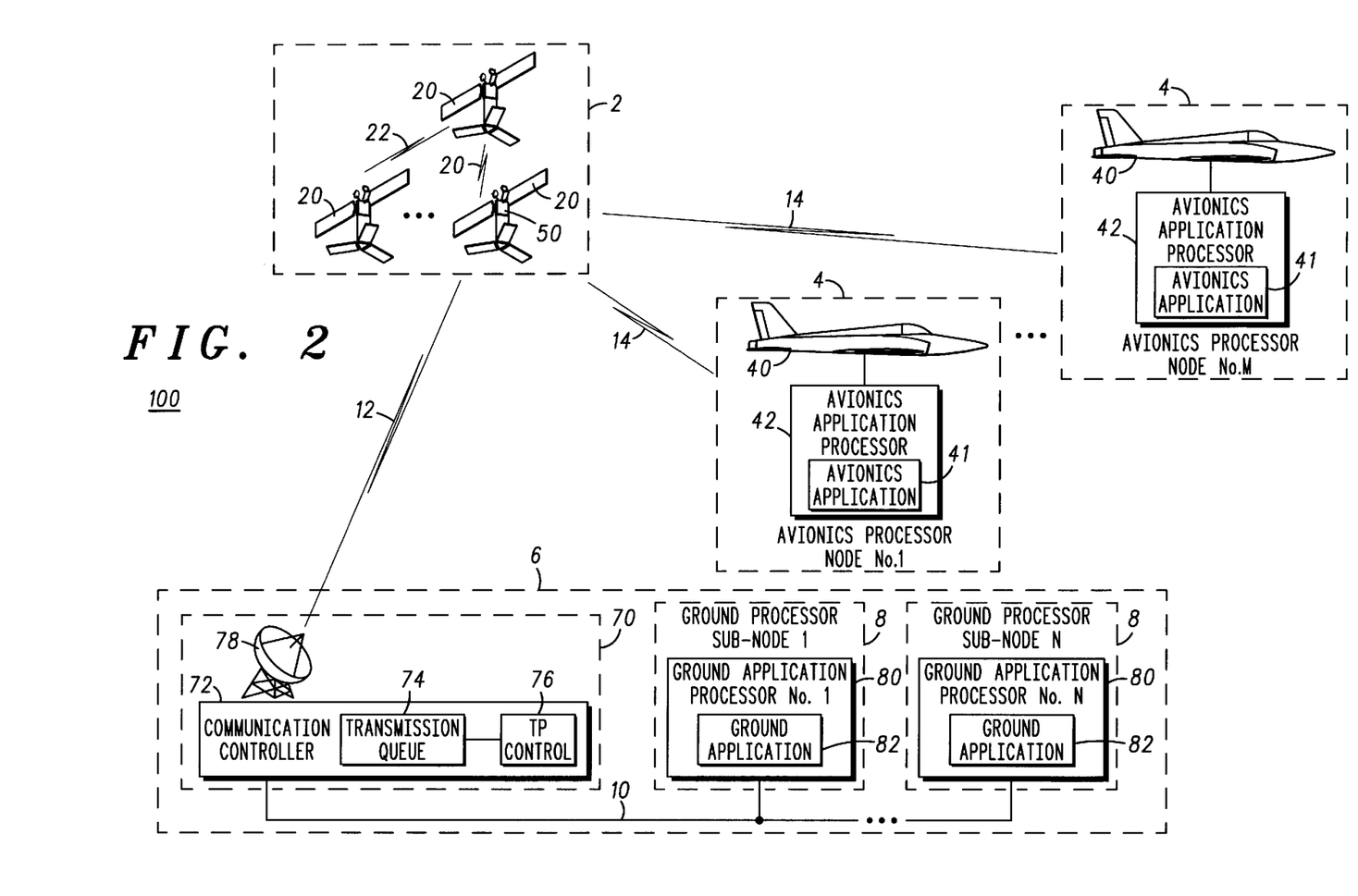
FIG. 2 is a block diagram of an air traffic control system in which a data message routing and delivery system in accordance with the invention operates.

FIG. 2 is a block diagram of an air traffic control (ATC) system 100, implementing a communication network such as the one shown at 1 in FIG. 1, in which a data message routing and delivery system in accordance with the invention operates. In the embodiment shown, ground processing node 6 comprises a plurality of N of ground processing sub-nodes 8. Each ground processing sub-node 8 is shown as being identical, and is each configured to share a satellite ground link 12 for sending data messages to, routing data messages through, receiving data messages from, or receiving data message routed through satellite processing node 2. Accordingly, ground processing node 6 also includes a satellite gateway 70. Satellite gateway 70 includes a communications controller 72, a transmission queue 74, a transmission prioritizing controller 76, and a transceiver 78. Data messages to be transmitted over satellite ground link 12 are queued in transmission queue 74 temporarily until actually transmitted. Transmission prioritizing controller 76, discussed in more detail hereinafter, may be employed to rank the data messages contained in the transmission queue 74 in order of transmission priority. Each ground processing sub-node 8 is configured to send and receive data messages to and from satellite gateway 70 over a local communication link 10. Local communication link 10 may be implemented using any conventional optical, wired or wireless communication system.

In accordance with the invention, ground processing node 6 is configured to execute a ground application on a ground application processor. In the embodiment shown, at least one ground processing sub-node 8 is configured to execute a corresponding ground application 82 on a respective ground application processor 80. The ground application 82 may be a simple message mailbox service, such as an electronic mail (e-mail) service, or it may be a more sophisticated application that interfaces with another application executing on a different processing node in the communications network. Also in accordance with the invention, each avionics processing node 4 is preferably implemented aboard a respective aircraft 40, and is configured to execute a corresponding avionics application 41 on a respective avionics application processor 42. The avionics application 41 may also be a simple mailbox service, or may be a more sophisticated application configured to interface with another application executing on another processing node in the communication network.

Satellite processing node 2 preferably includes a satellite 20 having a controller 50, discussed hereinafter, which manages inter-link communication and data message routing. As described previously, satellite processing node 2 may be implemented with a satellite communications network comprising a plurality of like satellites 20 having respective controllers 50 and which communicate via inter-satellite crosslinks.

In the ATC system 100 of FIG. 2, data messages may be passed between any two of the network nodes 2, 4 or sub-nodes 8. Messages are passed between each ground processing sub-node 1–N and between each ground processing sub-node 8 and gateway 70, over local communication link 10. Messages are passed between gateway 70 and satellite network node 2 over satellite ground link 12. Messages are passed between satellite network node 2 and avionics network nodes 4 over satellite communications links 14. Accordingly, a data message may be passed between a ground application 82 and an avionics application 41 over local communication link 10, satellite ground link 12, and a satellite communication link 14, or vice versa. Messages may be passed between different ground applications 82 over local communication link 10. Messages also may be passed between different avionics applications 41 through satellite 20 via one or more satellite communication links 14.

The data message routing and delivery system of the present invention may be employed to provide a messaging service between an air traffic controller and pilots or aircraft controls. The data message routing and delivery system may also be employed to provide a passenger messaging service, whereby an avionics application 41 is made available to passengers. For example, avionics application 41 may be made accessible to individual passengers via interactive media systems located at each seat.

Figure 3:
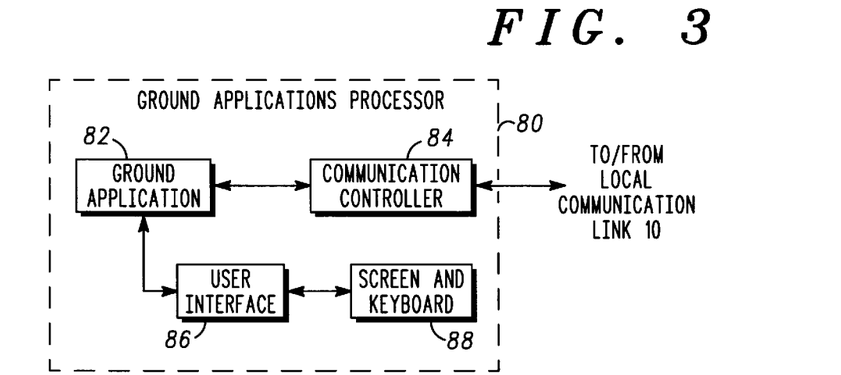
FIG. 3 is a block diagram of a ground applications processor at a network processing node in accordance with a preferred embodiment of the invention.

FIG. 3 illustrates the ground applications processor 80. Ground applications processor 80 executes one or more ground applications, such as ground application 82 shown in FIG. 3. Ground application processor 80 may be any commercially available program controlled processor unit, where ground application 82 may be stored in a memory unit associated with the ground application processor 80. Ground applications processor 80 preferably includes a user interface 86 through which input/output data may be routed to and from I/O devices (e.g., a screen, keyboard, or headset). Ground applications processor 80 also includes a communication controller 84 which handles transmitting and receiving data messages to and from local communication link 10. Accordingly, communication controller 84 will typically format a data message into a data packet which conforms to the transmission protocol used to transmit data over the ground link. Additionally, communication controller 84 handles the synchronization, transmission, and receipt of data packets over local communication link 10, and may also be configured to handle encryption/decryption, if applicable, and any necessary conversions between data messages and data packets.

Figure 4:
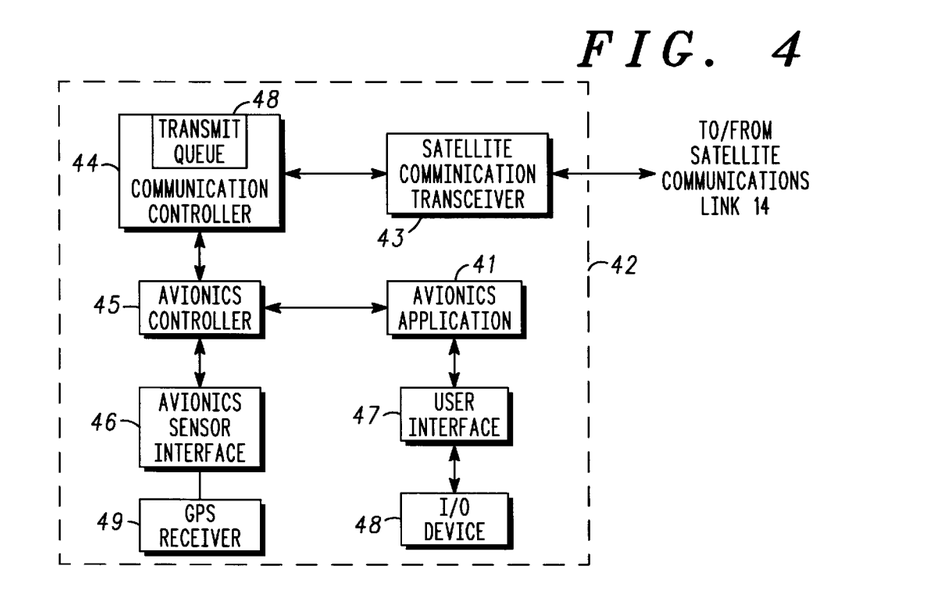
FIG. 4 is a block diagram of an avionics application processor at a network processing node in accordance with a preferred embodiment of the invention.

FIG. 4 is a block diagram of a preferred embodiment implementation of avionics application processor 42. Avionics application processor 42 executes one or more avionics applications, such as avionics application 41 in FIG. 4. Avionics application processor 42 may be any commercially available program controlled processor unit, where avionics application 41 may be stored in a memory unit associated with the avionics application processor 42. Avionics application 41 may send or receive input/output data which is input to and output from I/O device 48 via a user interface 47. I/O device 48 may include a screen, keyboard, headset, interactive media system, or any other conventional I/O device or combination thereof. Avionics applications processor 42 is also provided with various sensor data, which includes a position locator device, which is preferably a GPS receiver 46. GPS (Global Positioning System) receivers are known in the art, and utilize signals received from a GPS satellite constellation to determine the absolute location (i.e., latitude, longitude, altitude) of the GPS receiver relative to the center of the Earth. The position locator device or GPS receiver 49 allows the avionics processing node 4 to self-determine its location. Avionics application processor 42 also includes an avionics controller 45 which processes data messages received from the avionics application 41 and data received from position locator device or GPS receiver 49. Avionics controller 45 handles message formatting for data messages to be transmitted over satellite communication link 14. Data messages to be transmitted over satellite communication link 14 are sent to a communications controller 44 which formats data messages into data packets and handles encryption/decryption (if applicable). The communications controller 44 also handles data message prioritization and channel access. In this respect, communications controller 44 preferably includes a transmission queue 48 where data messages are queued and sorted in order of data message priority before being transmitted. Satellite communications transceiver 43 handles the synchronization, transmission of data packets in the transmission queue, and receipt of data packets over satellite communications link 14.

Figure 5:
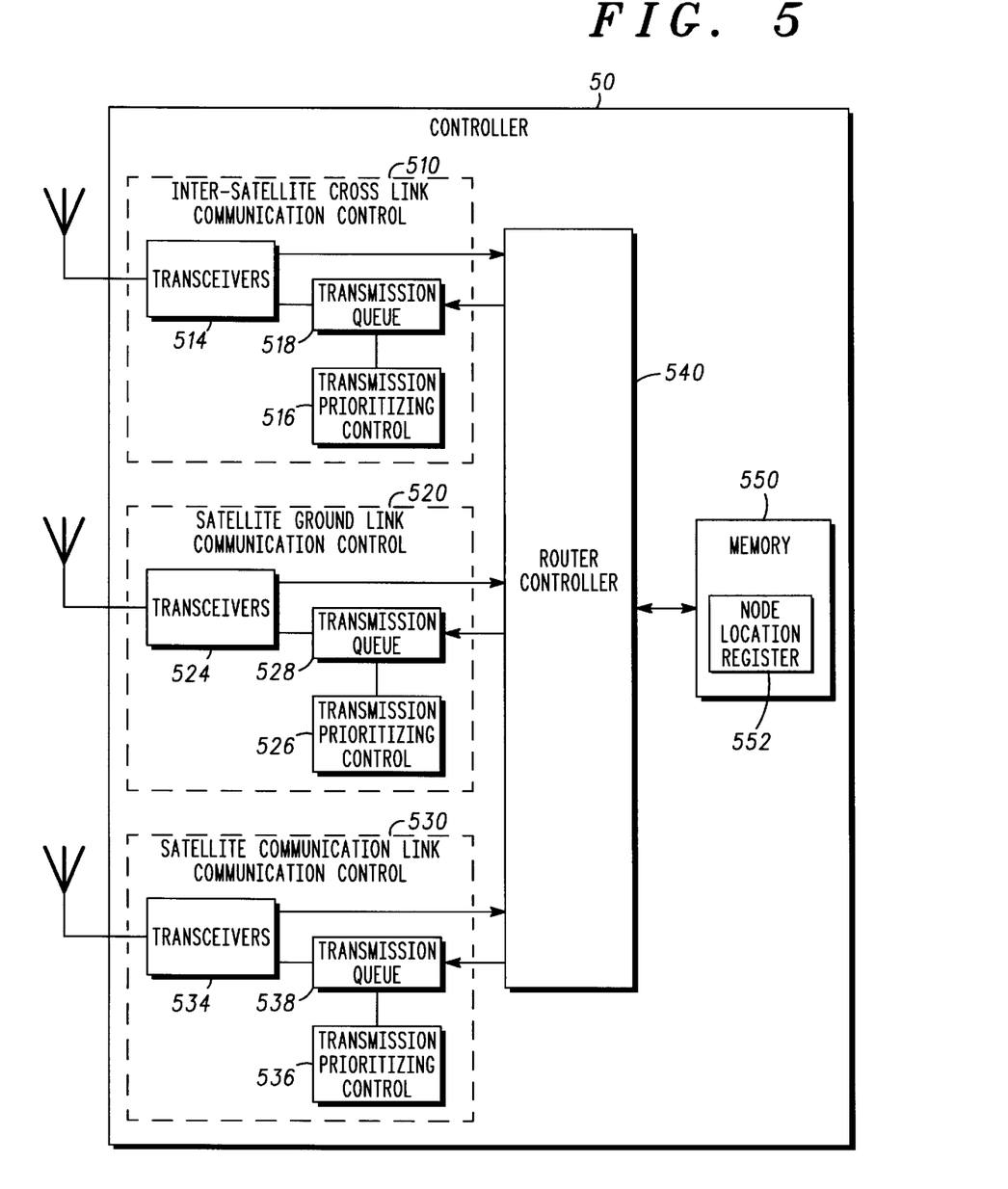
FIG. 5 is a block diagram of a satellite controller.

FIG. 5 is a block diagram of controller 50 in satellite 20 of FIG. 2. As described previously, controller 50 manages inter-link communication and data message routing. In the ATC system 100 shown in FIG. 2, satellite processing node 2 preferably comprises a satellite communications network including a plurality of satellites, identically shown as 20. In this embodiment, controller 50 must manage inter-link communication and data message routing over inter-satellite cross-links 22, satellite ground links 12, and satellite communication links 14. Accordingly, controller 50 in FIG. 5 includes an inter-satellite crosslink communication controller 510 which transmits and receives data packets over inter-satellite cross-links 22 via transceiver 514, a satellite ground link communication controller 520 which transmits and receives data packets over satellite ground links 12 via transceiver 524, and a satellite communication link communication controller 530 which transmits and receives data packets over satellite communication links via transceiver 534. Each communication controller 510, 520, 530 includes respective transmission queues 518, 528, 538 for temporarily storing data packets that are waiting to be transmitted. Controller 50 also includes a router controller 540 and a memory 550 in which a node location register 552 is maintained. When a data packet is received via one of the transceivers 514, 524, 534, the router controller 540 looks up the location of the intended destination node of the data packet which is contained in the node location register 552, assigns a link-type and communications channel over which the data packet will be transmitted, and sends the data packet to the appropriate communication controller 510, 520 or 530 to handle the transmission of the data packet. If the intended destination node of the data packet is the satellite 20 itself, the router controller causes the data packet to be sent to its intended destination (not shown) within the satellite to be processed.

In accordance with the invention, at least one, and preferably all, of the network processing nodes 2, 4 and 6 in communication network 1 of FIG. 1 includes a transmission prioritizing controller as part of its communication controller. In the embodiment shown in FIG. 2, gateway 70 includes a transmission prioritizing controller 76 as part of its communications controller 72. Furthermore, as shown more clearly in FIG. 5, satellite processing node 2 includes a transmission prioritizing controller for each communications controller in each controller 50 of each satellite 20. The transmission prioritizing controllers in controller 50 of FIG. 5 are shown at 516 in communication controller 510, 526 in communication controller 520, and 536 in communication controller 530. Each transmission prioritizing controller 76, 516, 526, 536 monitors the priority of each data message in its respective transmission queue 74, 518, 528, 538, and sorts them in order of priority such that data messages of higher priority are transmitted before data messages of lower priority.

Figure 6:
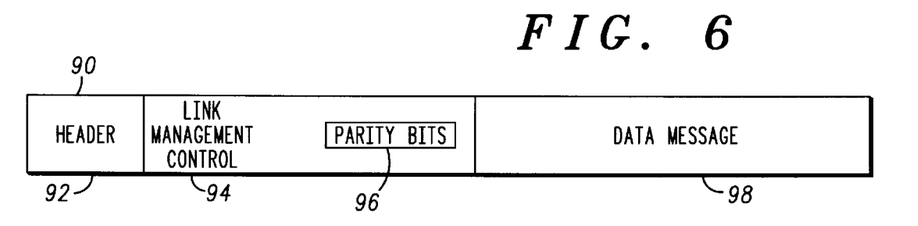
FIG. 6 is a diagram of a data packet illustrating an example packet format which allows the data message routing and delivery system of the invention to prioritize data messages.

FIG. 6 illustrates the format for a data packet 90 which may be used to support data message prioritization in the data message routing and delivery system of the present invention. Each data packet 90 includes a conventional header 92, link management control information 94, and the data message 98. The link management control information 94 preferably includes a set of priority bits 96. The priority bits 96 are decoded by transmission prioritizing controllers 76, shown in FIG. 2 with prioritizing controller, 516, 526, 536 as shown in FIG. 5 at respective network processing nodes 6 and 2. The priority bits 96 indicate the priority of the message, which is used by each transmission prioritizing controller 76, 516, 526, 536 to rank any data messages queued for transmission over respective links 12, 22 and 14. Priority bits 96 may be set by an application that generates the message body, by the processor that executes the application, or by a communications controller that formats the message into a packet. The ability to rank the priority of a message allows an emergency message packeted with emergency priority bits 96 to be routed more quickly through the communication network than it might be otherwise.

Figure 7:
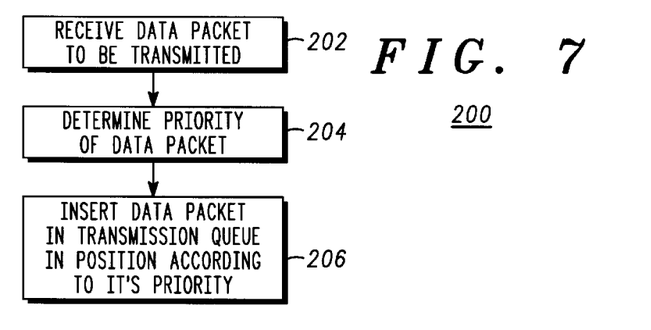
FIG. 7 is a flowchart illustrating a method for a transmission prioritizing controller to achieve data packet prioritization in a transmission queue.

FIG. 7 is a flowchart illustrating the operation of a transmission prioritizing controller 76, 516, 526, 536 for managing its respective transmission queue 74, 518, 528, 538. As shown in FIG. 7, the method, shown at 200, includes a first step 202 of receiving a data packet to be transmitted.

In a second step 204, the transmission prioritizing controller 76, 516, 526, 536 determines the priority rank of the data message. This is accomplished by decoding the priority bits in the data packet and ranking the priority of the message according to its encoded priority. If the encoded priority bits indicate that the message body contains an emergency message, for example, the transmission prioritizing controller 76, 516, 526, 536 preferably affords the data packet highest priority to enable it to reach its destination as soon as possible. In another embodiment, each network processing node 2, 4, 6 in the communications network may be assigned a node priority rank which may be utilized in determining the priority of a data packet whose source or destination is that network processing node 2, 4, 6. Alternatively, each network processing node may be assigned both a source node priority rank and a destination node priority rank, which may be different depending on whether the data packet comes from or is sent to the particular network processing node. In yet another embodiment, the priority rank of the data packet may also be set according to a tiered ranking system which combines the above methods. For example, a data packet may be ranked on a first tier according to its encoded priority bits. Then each data packet of equal priority ranking may be further ranked according to the assigned priority rankings of its source and destination network processing nodes.

In a step 206, the transmission prioritizing controller 76, 516, 526, 536 inserts the data packet in the appropriate location in the queue according to priority ranking. In the preferred embodiment, the transmission prioritizing controller 76, 526, 526, 536 scans the priority ranks of the data packets contained in its transmission queue to determine the appropriate location. One method for implementing the method transmission queue is to use some form of linked list, which a conventional data structure known by those skilled in the art.

Figure 8:
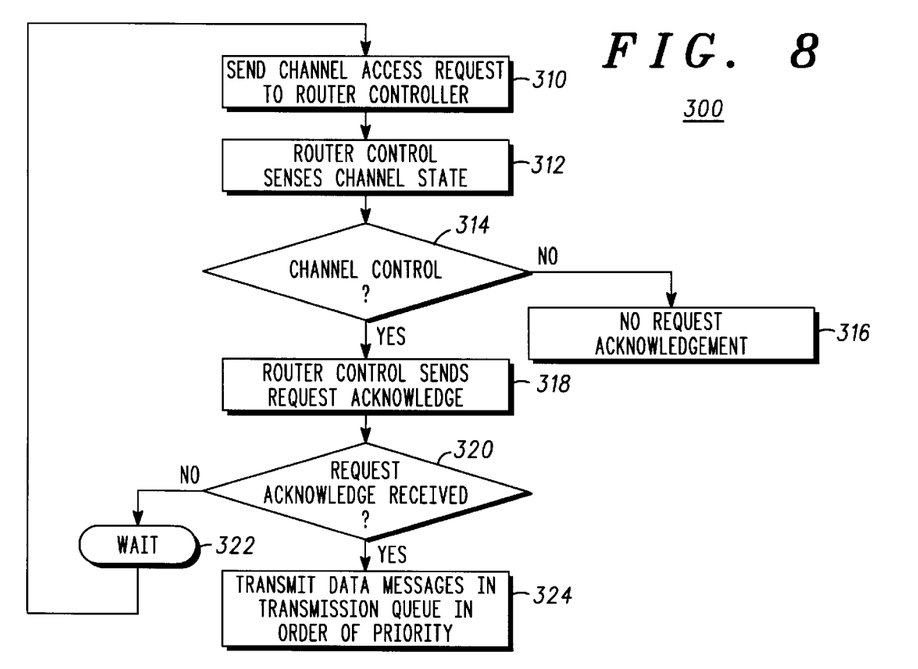
FIG. 8 is a flowchart illustrating a method for exchanging data messages between different network processing nodes.

FIG. 8 is a flowchart illustrating the method 300 which may be implemented on each network node 2, 4 and 6 that transmits data messages, preferably as part of its communications controller, for transmitting data messages to another network processing node. Accordingly, in order to send a data message contained in a data packet waiting in a transmission queue, the communications controller first sends a channel access request to a transmission prioritizing controller in a step 310. The transmission prioritizing controller may be located at any network processing node 2, 4, and 6 that has access to the channel. In the preferred embodiment, transmission prioritizing controllers are placed at network processing nodes which have multiple links independently leading to different network processing nodes. Thus, in the embodiment shown in FIG. 2, gateway 70 and satellite network node 2 include respective transmission prioritizing controllers 76 and 516, 526, 536. In a step 312, the transmission prioritizing controller senses the state of the requested channel. In the preferred embodiment, a carrier sense multiple access (CSMA) technique is employed. The state of the requested channel is determined in a step 314. Thus, in the CSMA technique, if the transmission prioritizing controller detects energy on the requested channel, the channel is occupied. If no energy is detected on the requested channel, the channel is clear. If the channel is clear, the transmission prioritizing controller sends a channel access request acknowledge message back to the communications controller in a step 318. If the requested channel is occupied, no acknowledge is sent, as shown in step 316. In a step 320, the communications controller determines if a channel access request acknowledge has been received. If after a timeout period no acknowledge has been sent, the communications controller waits for a time in a step 322, and then repeats steps 310 through 320. Once a channel access request acknowledge has been received, the communications channel transmits the data packets contained in the transmission queue, which are preferably ranked in order of priority, over the channel.

Figure 9:
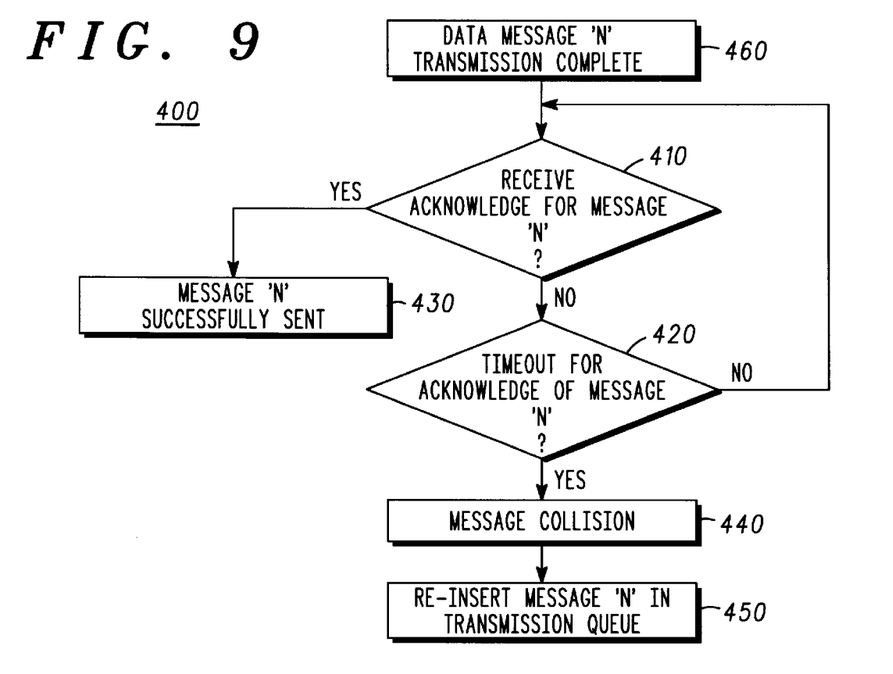
FIG. 9 is a flowchart illustrating a method for detecting message collisions.
Figure 10:
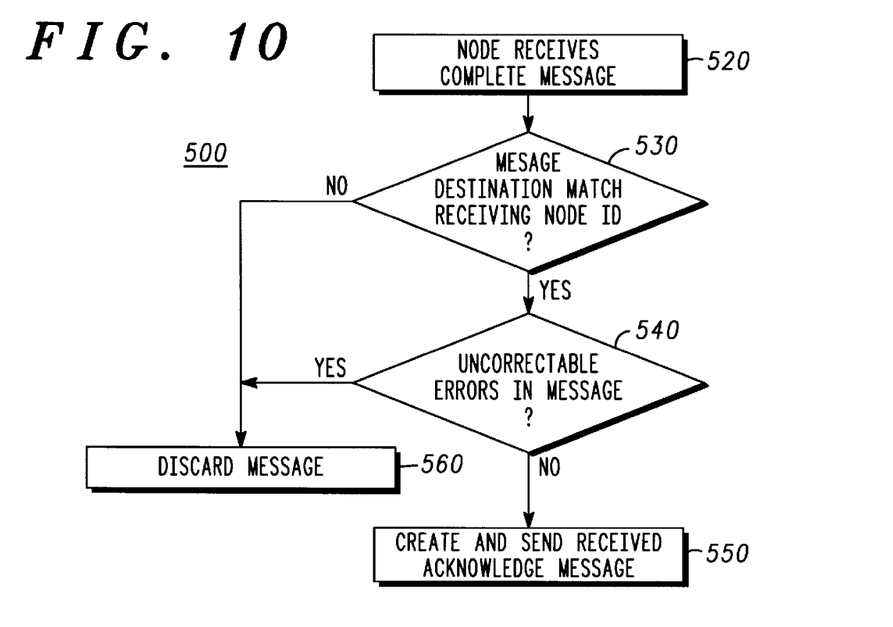
FIG. 10 is a flowchart illustrating a method for detecting misguided or corrupted messages.

With the CSMA technique, there is a probability of a message collision between the transmitted packet from one node 4 or 6 and one or more other nodes. This collision would be due to two units, executing method 300 of FIG. 8, that simultaneously determine that the channel is inactive and begin transmitting messages on the same channel. This situation could occur on collisions between avionics processing nodes 4 or an avionics processing node 4 and a satellite processing node 6. The embodiment shown in FIG. 9, describes a method 400 in the transmitting unit that ensures that messages are delivered over the CSMA link even in the situation that a message collision occurs. FIG. 10 describes a method 500 that works in conjunction with method 400 in the receiving unit of avionics processing nodes 4 or satellite processing nodes 6. Method 500 shows that when a message is received 520 by a processing node 4, 6, the receiving unit examines 530 the message destination identification bits to determine if the receiving node is actually the destination for the message. If not, then the receiver discards the message 560. If the check 530 of the message destination identification bits indicates that the message is intended for the node, then the message is error checked 540 to determine if it has been properly received without uncorrectable errors. If the error checked 540 message did include uncorrectable errors, then the message is discarded 560. If the message destination check 530 and error check 540 were both found to be true, then the receiving unit creates 550 a new message acknowledging that the original message was accurately received, and sends the new acknowledge message to the processing node's message transmission queue 74, 518, 528 and 538.

As described in method 300, this newly created acknowledge message is sent back to the processing node that transmitted 324 the original message. After the transmission of the original message is complete 460, the node checks to determine if its receiver detects a message 410 acknowledging that the destination has received the message without uncorrectable errors. The receiver keeps checking for the acknowledgment message for a maximum time as determined by a time-out loop 420. If the message originating node detects the acknowledge message, then the original message is marked as successfully sent 430. If the message acknowledge time-out occurs before the acknowledge message is received, then the originating node determines that a message collision has occurred 440. The original message is then re-entered 450 in the node's transmission queue for another try 300.

There are several methods by which a transmission prioritizing controller may determine the priority of a given data message. The methods described herein are shown by way of example and not limitation. Factors which may be considered by a transmission prioritizing controller in ranking the priority of a data message include priority indications (such as the encoded priority bits 96 in the data packet 90 generated by the application which generated the data message, a system-wide ranking of each network processing node in the communications network, and the source and or destination IDs associated with the data message.

As mentioned in the background section, one reason that data routing and messaging services have been unavailable in the past is that the location of an airborne aircraft changes rapidly and thus the destination of a message may not be known. Accordingly, as described previously, each avionics processing node 4 shown in FIG. 1 includes a position location device or GPS receiver 49 (referenced in FIG. 4) which determines the location of the avionics processing node 4. The location of the avionics processing node 4 may then be made known in the communication network 1 according to various methods.

One method is to implement in the avionics processing node 4 means for periodically reporting its location to a router controller 540 in a satellite 20 in satellite processing node 2. The avionics processing node 4 is preferably configured to periodically send a message containing its location to a router controller 540 in the controller 50 of a satellite 20 of satellite processing node 2. The router controller 540 maintains a node location register 552 of each network node and corresponding location in the communication network 1. Each avionics network node 4 updates its location in the node location register 552 often enough so that the router controller 540 may route a message addressed to it over an appropriate communication link.

One method for allowing a data message to be sent to a given avionics processing node 4 without actually determining the location of the avionics processing node 4 is to send the data message to a satellite communications network implemented in satellite processing node 2, where the data message is broadcast over every satellite 20 in the satellite communication network.

Both methods described above require the satellite 20 or satellite communications network implemented at satellite processing node 2 to cover all potential areas that the aircraft may travel. Accordingly, in one embodiment of the invention, the satellite communications network provides global coverage. One such satellite communications network which may be used to implement satellite processing node 2 is the IRIDIUM™ satellite communication network, developed by the Satellite Communications Division (SATCOM) of Motorola, Inc. in Chandler, Ariz. The IRIDIUM™ satellite communications network is an array of low earth orbit (420 nautical miles) satellites arranged to orbit the earth so as to provide substantially world-wide cellular radio coverage. Voice and data may be transmitted via the IRIDIUM™ satellite communications network using an IRIDIUM™ subscriber unit (ISU). An ISU may call another ISU or an entity connected to a public switched telephone network (PSTN) by dialing a conventional telephone number or by using other addressing methodologies. The call request is transmitted to an IRIDIUM™ satellite which is visible Over-The-Horizon (OTH) of the calling ISU via a subscriber-unit-to-satellite link. The OTH satellite routes the call through the IRIDIUM™ satellite communications network to a satellite in view of the destination ISU or local IRIDIUM™ gateway that services the PSTN of the dialed number. IRIDIUM™ gateways, located in key areas around the world, interconnect the IRIDIUM™ satellite network to PSTNs. The details of the IRIDIUM™ satellite communication system are shown in U.S. Pat No. 5,410,728 to Bertiger et al., entitled "Satellite Cellular Telephone and Data Communications System", assigned to Motorola, Inc., Schaumburg, Ill., and is incorporated herein by reference.

The system and method of the present invention may be utilized to provide data message routing and delivery between air traffic control centers or other airline entities and airborne aircraft for internal use only by various airline entities, air traffic control entities, pilots, and or automated avionics control units, or may be made available commercially by ground based service providers to enable ground based applications and airborne applications to interface via data messages. For example, the present invention may be used to provide a network "talk" function between an air traffic controller and a pilot of an airborne aircraft. Network "talk" functions are known in the art, and are basically a full duplex channel over which data messages are exchanged in realtime. Typically, both the sender and receiver send messages by entering the message via a keyboard, and receive messages that are output to a screen. In another example, the present invention may be used to provide an e-mail service between either an air traffic controller, an airline entity, or a commercial network service provider and either a pilot, the crew, and or passengers of the airborne aircraft. As yet another example, the present invention may be utilized to provide more sophisticated data message services to pilots and or passengers aboard an airborne aircraft. For example, the present invention may be utilized to allow a passenger to establish a dial-up connection with a ground-based network and to run a ground-based application remotely from the aircraft. It will be appreciated by those skilled in the art that the possibilities of use for the present invention are many. Accordingly, the examples described herein are by way of example only and not limitation.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. An avionics data message routing and delivery system, comprising:

a communications network comprising:

a plurality of network processing nodes, said plurality of network processing nodes comprising:

a ground processing node configured to send and receive data packets to and from others of said plurality of network processing nodes;

a satellite processing node configured to send, receive, and route data packets to and from others of said plurality of network processing nodes;

a first avionics processing node aboard a first airborne aircraft, said first avionics processing node configured to send and receive data packets to and from others of said plurality of network processing nodes, said first avionics processing node comprising a first position locator device for determining a location of said first avionics processing node;

a satellite ground link for routing data packets between said ground processing node and said satellite processing node;

a first satellite communication link for routing data packets between said satellite processing node and said first avionics processing node;

a controller configured to determine the locations of each of said plurality of network processing nodes and control routing of data packets between said plurality of network processing nodes;

at first application executing on a first one of said plurality of network processing nodes; and a second application executing on a second one of said plurality of network processing nodes;

wherein a data message is generated by said first application, routed in a data packet over at least one of said satellite ground link and said first satellite communication link from said first one of said plurality of network processing nodes to said second one of said plurality of network processing nodes, and received by said second application.

2. The avionics data message routing and delivery system of claim 1, said controller comprising:

a transmission queue for temporarily storing data packets waiting to be transmitted over one of said satellite ground link or said first satellite communication link; and a communications controller for transmitting data packets temporarily stored in said transmission queue over said satellite ground link or said first satellite communication link.

3. The avionics data message routing and delivery system of claim 2, wherein:

said communications controller transmits said data packets temporarily stored in said transmission queue in order of a data packet priority associated with each of said data packets.

4. The avionics data message routing and delivery system of claim 3, said controller further comprising:

a transmission prioritizing controller for determining said data packet priority associated with each of said data packets temporarily stored in said transmission queue.

5. The avionics data message routing and delivery system of claim 4, wherein:

said transmission prioritizing controller determines said data packet priority associated with each of said data packets temporarily stored in said transmission queue based on priority bits encoded in each of said data packets temporarily stored in said transmission queue.

6. The avionics data message routing and delivery system of claim 5, wherein:

said priority bits encoded in one of said data packets temporarily stored in said transmission queue comprises an emergency priority code by which said transmission prioritizing controller determines that said data packet contains an emergency message.

7. The avionics data message routing and delivery system of claim 1, said satellite processing node comprising:

a global coverage satellite communications network.

8. The avionics data message routing and delivery system of claim 1, said first avionics processing node comprising:

a satellite communications device configured to send and receive data packets to and from said satellite processing node.

9. The avionics data message routing and delivery system of claim 1, said first position locator device comprising:

a GPS receiver.

10. The avionics data message routing and delivery system of claim 1, wherein:

said controller requests said location of said first avionics processing node; and said first avionics processing node sends a position message to said controller, said position message containing said location of said first avionics processing node.

11. The avionics data message routing and delivery system of claim 1, wherein:

said first avionics processing node periodically sends a position message to said controller, said position message containing the location of said first avionics processing node.

12. The avionics data message routing and delivery system of claim 1, wherein:

said ground processing node comprises an air traffic control center.

13. The avionics data message routing and delivery system of claim 1, wherein:

said ground processing node executes a service provider application.

14. The avionics data message routing and delivery system of claim 13, wherein:

said first avionics processing node executes a first avionics application, said first avionics application configured to interface with said service provider application to allow messages to be sent between said service provider application and said first avionics application.

15. The avionics data message routing and delivery system of claim 14, wherein:

said service provider application comprises a mailbox service application for sending and receiving electronic data messages to and from one or more of said plurality of network processing nodes.

16. The avionics data message routing and delivery system of claim 15, wherein:

said first avionics application comprises said mailbox service application for sending and receiving electronic data messages to and from one or more of said plurality of network processing nodes.

17. The avionics data message routing and delivery system of claim 1, further comprising:

a second avionics processing node aboard a second airborne aircraft in said communications network, said second avionics processing node configured to send and receive data packets to and from others of said plurality of network processing nodes, said second avionics processing node comprising a second position locator device for determining a location of said second avionics processing node; and a second satellite communication link for routing data packets between said satellite processing node and said second avionics processing node;

wherein said data message generated by said first application is routed in a data packet over at least one of said satellite ground link, said first satellite communication link, and said second satellite communication link from said first one of said plurality of network processing nodes to said second one of said plurality of network processing nodes, and received by said second application.

18. The avionics data message routing and delivery system of claim 17, said controller comprising:

a transmission queue for temporarily storing data packets waiting to be transmitted over at least one of said satellite ground link, said first satellite communication link, or said second satellite communication link; and a communications controller for transmitting data packets temporarily stored in said transmission queue over said satellite ground link, said first satellite communication link, or said second satellite communication link.

19. The avionics data message routing and delivery system of claim 18, wherein:

said communications controller transmits said data packets temporarily stored in said transmission queue in order of a data packet priority associated with each of said data packets.

20. The avionics data message routing and delivery system of claim 19, said controller further comprising:

a transmission prioritizing controller for determining said data packet priority associated with each of said data packets temporarily stored in said transmission queue.

21. The avionics data message routing and delivery system of claim 20, wherein:

said transmission prioritizing controller determines said data packet priority associated with each of said data packets temporarily stored in said transmission queue based on priority bits encoded in each of said data packets temporarily stored in said transmission queue.

22. The avionics data message routing and delivery system of claim 21, wherein:

said priority bits encoded in one of said data packets temporarily stored in said transmission queue comprises an emergency priority code by which said transmission prioritizing controller determines that said data packet contains an emergency message.

23. The avionics data message routing and delivery system of claim 17, said satellite processing node comprising:

a global coverage satellite communications network.

24. The avionics data message routing and delivery system of claim 17, said first avionics processing node and said second avionics processing node each comprising:

a satellite communications device configured to send and receive data packets to and from said satellite processing node.

25. The avionics data message routing and delivery system of claim 17, each of said first position locator device and said second position locator device comprising:
   a GPS receiver.

26. The avionics data message routing and delivery system of claim 17, wherein:
   said controller requests said location of said first avionics processing node; and
   said first avionics processing node sends a position message to said controller, said position message containing said location of said first avionics processing node.

27. The avionics data message routing and delivery system of claim 17, wherein:
   said first avionics processing node periodically sends a position message to said controller, said position message containing the location of said first avionics processing node.

28. The avionics data message routing and delivery system of claim 17, wherein:
   said controller requests said location of said second avionics processing node; and
   said second avionics processing node sends a position message to said controller, said position message containing said location of said second avionics processing node.

29. The avionics data message routing and delivery system of claim 17, wherein:
   said second avionics processing node periodically sends a position message to said controller, said position message containing the location of said second avionics processing node.

30. The avionics data message routing and delivery system of claim 17, wherein:
   said ground processing node comprises an air traffic control center.

31. The avionics data message routing and delivery system of claim 17, wherein:
   said ground processing node executes a service provider application.

32. The avionics data message routing and delivery system of claim 31, wherein:
   said first avionics processing node executes a first avionics application, said first avionics application configured to interface with said service provider application to allow messages to be sent between said service provider application and said first avionics application.

33. The avionics data message routing and delivery system of claim 31, wherein:
   said second avionics processing node executes a second avionics application, said second avionics application configured to interface with said service provider application to allow messages to be sent between said service provider application and said second avionics application.

34. The avionics data message routing and delivery system of claim 31, wherein:
   said service provider application comprises a mailbox service application for sending and receiving electronic data messages to and from one or more of said plurality of network processing nodes.

35. The avionics data message routing and delivery system of claim 32, wherein:
   said first avionics application comprises a mailbox service application for sending and receiving electronic data messages to and from one or more of said plurality of network processing nodes.

36. The avionics data message routing and delivery system of claim 33, wherein:
   said second avionics application comprises a mailbox service application for sending and receiving electronic data messages to and from one or more of said plurality of network processing nodes.

37. A method for routing and delivering data messages in an avionics communication system, said avionics communication system comprising: a plurality of network processing nodes comprising a ground processing node, a satellite processing node, and an avionics processing node aboard an airborne aircraft, said avionics processing node comprising a position locator device for determining an avionics processing node location of said avionics processing node; a satellite ground link for routing data packets between said ground processing node and said satellite processing node; a satellite communication link for routing data packets between said satellite processing node and said first avionics processing node; and a controller configured to determine the locations of each of said plurality of network processing nodes and control routing of data packets between said plurality of network processing nodes; said method comprising the steps of:
   at one of said plurality of network processing nodes:
   generating a data message destined for said avionics processing node;
   sending said data message to said controller for routing to said avionics processing node;
   at said controller:
   determining said avionics processing node location of said avionics processing node;
   routing said data message to said avionics processing node; and
   at said avionics processing node:
   sending said avionics processing node location to said controller;
   receiving said data message.

38. The method of claim 37, further comprising the steps of:
   at said controller:
   temporarily storing said data message in a transmission queue to wait for transmission over a communication link;
   determining a priority of said data message;
   ranking said data message with other data messages temporarily stored in said transmission queue according to said priority of said data message as compared to priorities of said other data messages temporarily stored in said transmission queue; and
   transmitting said data message and said other data messages temporarily stored in said transmission queue in order of ranking.

* * * * *